(12) United States Patent
Koziol

(10) Patent No.: US 7,270,277 B1
(45) Date of Patent: Sep. 18, 2007

(54) DATA ENCODING MARK FOR PLACEMENT IN A COMPACT AREA AND AN OBJECT CARRYING THE DATA ENCODING MARK

(76) Inventor: Jeffrey E. Koziol, 1211 S. Arlington Heights Rd., Arlington Heights, IL (US) 60005

( * ) Notice: Subject to any disclaimer, the term of this patent is extended or adjusted under 35 U.S.C. 154(b) by 240 days.

(21) Appl. No.: 10/849,843

(22) Filed: May 21, 2004

(51) Int. Cl.
*G06K 19/06* (2006.01)

(52) U.S. Cl. .................................................. 235/494

(58) Field of Classification Search ...............................
235/462.01–462.25, 494, 470, 454, 455
See application file for complete search history.

(56) References Cited

U.S. PATENT DOCUMENTS

| | | | | |
|---|---|---|---|---|
| 3,585,366 A | 6/1971 | Kern | | 235/61.11 |
| 3,643,068 A | 2/1972 | Mohan et al. | | 235/61.11 |
| 3,752,961 A | 8/1973 | Torrey | | 235/61.11 |
| 4,000,397 A | 12/1976 | Hebert et al. | | 235/61.11 |
| 4,308,455 A | 12/1981 | Bullis et al. | | 235/463 |
| 5,170,044 A | 12/1992 | Pastor | | 235/454 |
| 5,202,552 A * | 4/1993 | Little et al. | | 235/494 |
| 5,541,396 A * | 7/1996 | Rentsch | | 235/454 |
| 5,717,197 A * | 2/1998 | Petrie | | 235/494 |
| 5,725,253 A * | 3/1998 | Salive et al. | | 283/67 |
| 5,852,434 A | 12/1998 | Sekendur | | 345/179 |
| 5,861,613 A | 1/1999 | Apelberg et al. | | 235/464 |
| 6,000,614 A * | 12/1999 | Yang et al. | | 235/460 |
| 6,000,621 A * | 12/1999 | Hecht et al. | | 235/494 |
| 6,032,861 A * | 3/2000 | Lemelson et al. | | 235/456 |
| 6,088,482 A | 7/2000 | He et al. | | 382/202 |
| 6,101,477 A * | 8/2000 | Hohle et al. | | 705/1 |
| 6,116,507 A | 9/2000 | Fukuda et al. | | 235/454 |
| 6,131,807 A * | 10/2000 | Fukuda et al. | | 235/494 |
| 6,182,901 B1 * | 2/2001 | Hecht et al. | | 235/494 |
| 6,185,405 B1 | 2/2001 | Sueoka | | 399/367 |
| 6,478,232 B1 | 11/2002 | Dowling | | 235/494 |
| 6,533,182 B1 | 3/2003 | Ohshima et al. | | 235/494 |
| 6,601,772 B1 | 8/2003 | Rubin et al. | | 235/494 |
| 6,619,547 B2 | 9/2003 | Crowther et al. | | 235/454 |
| 6,647,142 B1 | 11/2003 | Beardsley | | 382/165 |
| 6,663,008 B1 | 12/2003 | Pettersson et al. | | 235/494 |
| 6,681,055 B1 | 1/2004 | Sato | | 382/275 |
| 6,705,531 B1 * | 3/2004 | Norton | | 235/492 |

FOREIGN PATENT DOCUMENTS

WO  03/107265 A1  12/2003

* cited by examiner

*Primary Examiner*—Thien Minh Le
(74) *Attorney, Agent, or Firm*—Roylance, Abrams, Berdo & Goodman, L.L.P.

(57) ABSTRACT

The encoding mark uses a series of shapes as a guide, each of shape capable of being encoded with a finite number, including zero, of distinctive markings. The encoding of a predetermined identifier is performed by placing a predetermined number of distinctive markings substantially on the perimeter of at least one of the shapes in any spatial orientation with respect to each other on the series of shapes. The predetermined number of distinctive markings and the specific one of the shapes on which the distinctive mark is placed corresponds to a predetermined identifier. Since the shapes may only be a guide, they are not required to appear on the object marked with the encoding mark.

21 Claims, 4 Drawing Sheets

DATA ENCODING MARK FOR PLACEMENT IN A COMPACT AREA AND AN OBJECT CARRYING THE DATA ENCODING MARK

FIELD OF THE INVENTION

The present invention relates to marking objects with encoded data. More particularly, the invention is directed towards a machine-readable background marking placeable in a small compact area to facilitate uniquely identifying objects irregardless of the mark orientation.

BACKGROUND OF THE INVENTION

In many machine-readable data encoding methods (bar code, MaxiCode, etc.), it is necessary for the encoded mark to be in the proper orientation or alignment to be accurately decoded. A variety of methods have been patented that attempt to solve this problem. U.S. Pat. No. 3,585,366 to Kern teaches a circular code that requires the user to place the point of a reading device in the center of the circular code. Alignment is assured by the point of the reading device protruding into a hole or dimple in the surface on which the circular code is affixed. Kern also uses bar-shaped indicia to represent the data encoded in the circular code.

U.S. Pat. No. 3,752,961 to Torrey teaches the use of a circular bar code. To decode the circular bar code, the proper orientation must be obtained, so that the information can be decoded in the correct order. Torrey decodes the circular barcode starting at a particular point and proceeding in a clockwise manner.

U.S. Pat. No. 4,308,455 to Bullis et al. teaches decoding a "CODABAR" or "Code39" which is an ordered arrangement of four bars and three spaces. Before accurate decoding can begin, a "start" code must be identified to insure accurate alignment and orientation of the barcode.

Circular barcodes used only for alignment purposes are disclosed in U.S. Pat. No. 6,088,482 to He et al.

More recent efforts to solve the orientation and alignment problems associated with barcodes still require configurations that identify the beginning and end of the bar code to insure proper orientation and alignment. U.S. Pat. No. 5,861,613 to Apelberg et al. teaches the use of a circular barcode with a relatively large "quiet zone" between the barcodes "start" and "stop" codes. By having a relatively large quiet zone, Apelberg insures that no matter how misaligned the reader is from the circular barcode the start of the barcode can found.

U.S. Pat. No. 3,643,068 to Mohan et al. has several circular codes including some that use "end cycles" that are similar to Apelberg's "quiet zones".

Another problem is placing a bar code in a small compact space. Since typical bar codes are horizontal, the amount of space in which they can fit is limited by the amount of horizontal space available on the object to be marked. Furthermore, a typically bar code can only encode approximately ten digits per inch.

In light of the problems associated with barcodes (horizontal or circular) attempts have been made to use dot (filled-in circles) codes as an alternative. U.S. Pat. No. 6,533,182 to Ohshima et al. utilizes dots arranged horizontally in place of bar codes, but requires the dot code to be bordered at the end of the horizontal dot code by timing marks. The timing marks are continuous columns of dots that are used by the reader to insure accurate decoding. U.S. Pat. No. 6,601,772 to Rubin et al. uses a matrix code in the shape of a circle. The code includes three curved targets surrounded by reserved white space and hexagonal cells laid out in a closely-packed hexagonal grid. The curved targets, reserved white space, and hexagonal cells all are used in some manner for targeting or alignment purposes. U.S. Pat. No. 6,663,008 to Pettersson et al. discloses a dot code that is offset from a nominal position along a raster scan, the location of the dot indicating the value of the dot. The raster scan can be in the shape of a square, triangular or hexagonal matrix. The assignee of the Pettersson et al. patent discloses a dot code in WIPO publication, WO 03/107265 A1, which utilizes dots of various diameters to convey certain information. Other examples of dot-code matrix type inventions are U.S. Pat. No. 6,185,405 to Yoshioka and U.S. Pat. No. 6,116,507 to Fukuda et al.

U.S. Pat. No. 6,478,232 to Dowling et al. discloses a dot code that has dots located in special regions of a circular array. However, Dowling also resorts to alignment markings that appear outside the circular array. Dowling requires that lines connect the dots of the circular array, indicating a sequence in which the dots were placed. The sequence is then used for decoding purposes.

U.S. Pat. No. 3,643,068 to Mohan et al. also discloses a circular code for representing a packed binary coded decimal, but the amount of data is limited because each circular band is crossed by a radial wedge that separates the circular bands into regions of equal size. Furthermore, Mohan requires that the data coding marks be in a specific spatial orientation to one another within the circular bands.

A need exists for an improved data encoding mark that provides an omni-directional reading capability and ease of decoding.

SUMMARY OF THE INVENTION

Accordingly, it is an object of the invention to provide an encoding mark (i.e. machine-readable code or identifying indicia) that does not require alignment marks for the code to be accurately detected, read and decoded.

Another object of the invention is to provide a machine-readable code that may be read from any perspective without concern for orientation or alignment, thereby, allowing the object on which the mark is placed, affixed or located to be in any orientation with respect to the encoding mark reader. The advantages of this capability allows for reduced handling operations of the object, faster recognition times because the object does not have to be manipulated for the encoding mark to be read, and simplicity of use of the entire encoding/decoding system.

Another object of the invention is to provide a code that may be placed within a small compact area without suffering from defects in detection or decoding.

Another object of the invention is to allow for reading of the code with automatic code readers or manually decoding the encoding mark.

Another object of the invention is to provide an encoding mark that is easily placeable on objects of any size and shape.

The foregoing objects of the invention are basically attained by arranging in an area on an object at least one of a plurality of shapes as a guide; and placing a predetermined number of distinctive markings in any spatial orientation with respect to each other substantially on or about the perimeter of at least one of said plurality of shapes to encode and mark the object with the data.

The foregoing objects are also attained by reading from any perspective the area in which the encoding mark is located; determining a point of reference for the encoding mark; counting the number of distinctive markings that make up the encoding mark, said distinctive markings located substantially on the perimeter of at least one of a plurality of concentric shapes, the said predetermined number of distinctive markings and the specific perimeter of one of the plurality of concentric shapes on which the distinctive mark is placed corresponding to a predetermined identifier; comparing the number of distinctive marks counted on the perimeter of each of the at least one of a plurality of concentric shapes in the counting step to the number of marks from each of the at least one of a plurality of concentric shapes corresponding to the predetermined identifier; and returning a result of said comparing step.

Other objects, advantages, and salient features of the invention will become apparent from the following detailed description, which, taken in conjunction with the annexed drawings, discloses preferred embodiments of the invention.

DRAWINGS

Referring now to the drawings which form part of this original disclosure:

DETAILED DESCRIPTION OF THE INVENTION

The Encoding Mark

As seen in FIGS. 1-4, the machine-readable encoding mark 10 in accordance with the present invention includes a series of substantially concentric shapes 30 and distinctive markings 20, placed on the perimeter 70 of concentric shapes 30. Concentric shapes means that the shapes have a common center. In a preferred embodiment, dots (filled-in circles) are placed substantially on the perimeter of concentric circles. Preferably, the distinctive markings may be of a color that provides sufficient contrast to the surface of the object, so that any reading device may obtain a distinct image of the encoding mark. It is conceivable that the object may be marked with concentric shapes which also may be of any color including matching the distinctive markings. Preferably, the concentric shapes will also have a high contrast to the surface of the object and the distinctive marks. The size of the distinctive marks is only limited by the device placing the mark and the optics required to collect an image of the encoded data for decoding. Dot densities measured in hundreds of micrometers are well known in the art. It is well known in the art that printers have resolutions of twelve hundred (1200) dots per inch and that lasers may be used to perform the encoding. Such prior art is not meant to limit the manner in which the encoding mark will be placed, but only as an illustration. Other methods of marking include engraving, imprinting, etching, molding, laser etching, laser engraving, overlaying, photochemical exposing, or holographic imprinting.

Figure 1:
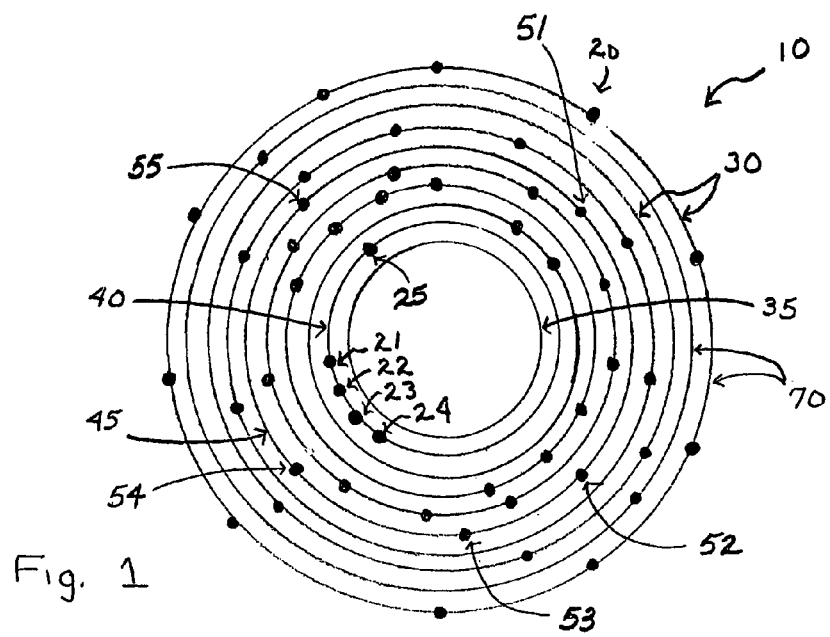
FIG. 1 is a schematic diagram of an encoding mark in accordance with the present invention including a plurality of distinctive marks substantially on the perimeter of a plurality of concentric shapes.
Figure 2:
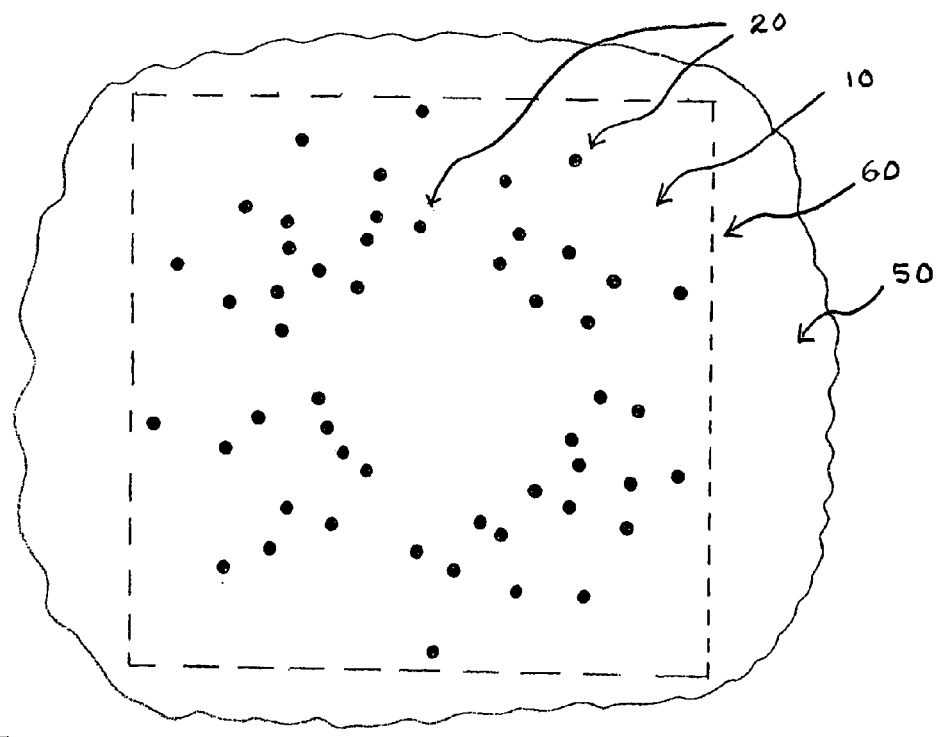
FIG. 2 is a schematic diagram of an alternative embodiment of the present invention showing the encoding mark on an object without the concentric shapes.

Turning to FIG. 1, the concentric shapes 30 may be placed on the object, but not necessarily, as shown in FIG. 2, and the encoding process continues with the placement of the distinctive markings. The distinctive markings 20 may be randomly placed in any location substantially on the perimeter 70 of the specific concentric shape 30 being marked. However, the locations of the distinctive markings on the specific concentric shape may also have meaning, such as a lot number. During the encoding process concentric shapes 30 serve as guides in placing distinctive markings 20 so that the data may be encoded as a unique identifier by the placement of a certain number of distinctive markings substantially on the perimeter of a specific concentric shape. The distinctive marks must be close enough to the perimeter 70 of a concentric shape to be positively identified as being on a specific concentric shape. As an example, suppose that the number of distinctive marks 20 for any specific concentric shape 30 is limited to ten (10) distinctive marks 20 per concentric shape 30. In FIG. 1 there are ten (10) concentric shapes 30; therefore, the total number of combinations of distinctive marks 20 and concentric shapes 30 is 10 billion (10,000,000,000) unique identifiers. In this embodiment, the concentric shapes 30 are a visible part of the encoding mark 10. However, in other embodiments as shown in FIG. 2, the concentric shapes 30 do not need to be visible. Furthermore, note that distinctive marks 21-24 are placed close together on the perimeter 70 of the concentric shape 30. In the present invention, the spatial distance between distinctive marks 20 on the same concentric shape 30 is irrelevant. Therefore, no matter the perspective, so long as the reference distance of the encoding mark may be determined, the distinctive mark will lie on the same concentric shape. For instance, concentric shape 40 and concentric shape 45 both have only five distinctive marks on each ring. If one interchanged the positions of the five distinctive marks 21-25 on concentric shape 40 with the five distinctive marks 51-55 on concentric shape 45, and vice versa, the code would be unchanged. The code would be unchanged because the total number of distinctive marks on concentric shape 40 would still be five and the same for concentric shape 45. Also, note that concentric shape 35 in FIG. 1 does not have any distinctive marks. The present invention does not require at least one distinctive mark to be on every concentric shape; i.e. each concentric shape may have from zero to a finite number of distinctive marks. The number of distinctive marks is limited by the size of the mark and the perimeter of the shape.

Turning now to a preferred embodiment illustrated in FIG. 2, the concentric shapes are not a visible or machine-readable part of the encoding mark 10, which is shown on the surface of an object 50. Only the distinctive marks 20 are readable by the decoder that reads the entire area 60 that contains the distinctive marks 20 of the encoding mark 10. Reading and decoding processes will be addressed below with respect to FIG. 6.

Figure 3:
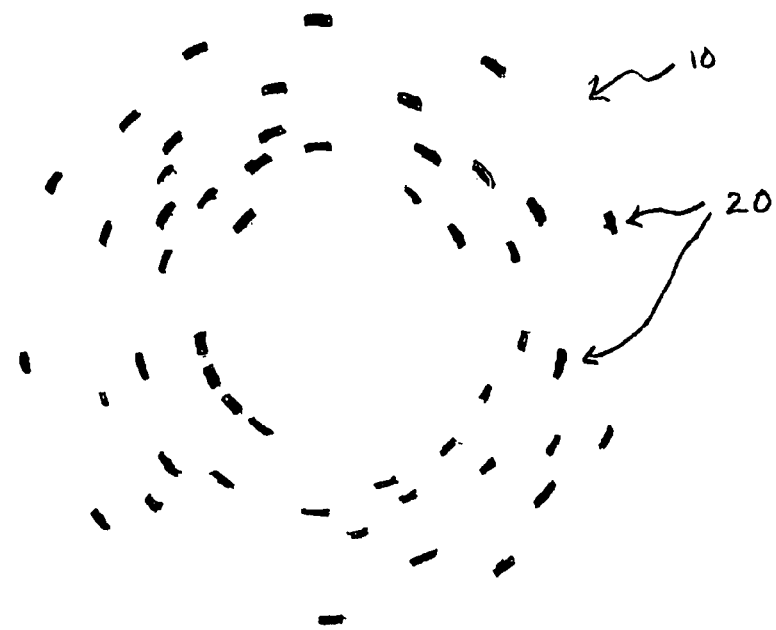
FIG. 3 shows an example of an alternative embodiment of the present invention with the distinctive markings of the encoding mark configured as arched bars.

FIG. 3 illustrates that the distinctive marks 20 of the encoding mark 10 do not have to be limited to only dots, but may be arched bars. The distinctive mark can be of any shape that is placeable on the perimeter of a concentric shape. For example, the distinctive mark may be any closed geometric figure such as, but not limited to, circles, dodecagons, polygons, rectangles, rhombi, squares, stars, trapezoids, or triangles. Any closed geometric figure is defined as a geometric figure having arcs or lines that ultimately meet so that there is an inside and an outside of the geometric figure.

Figure 4:
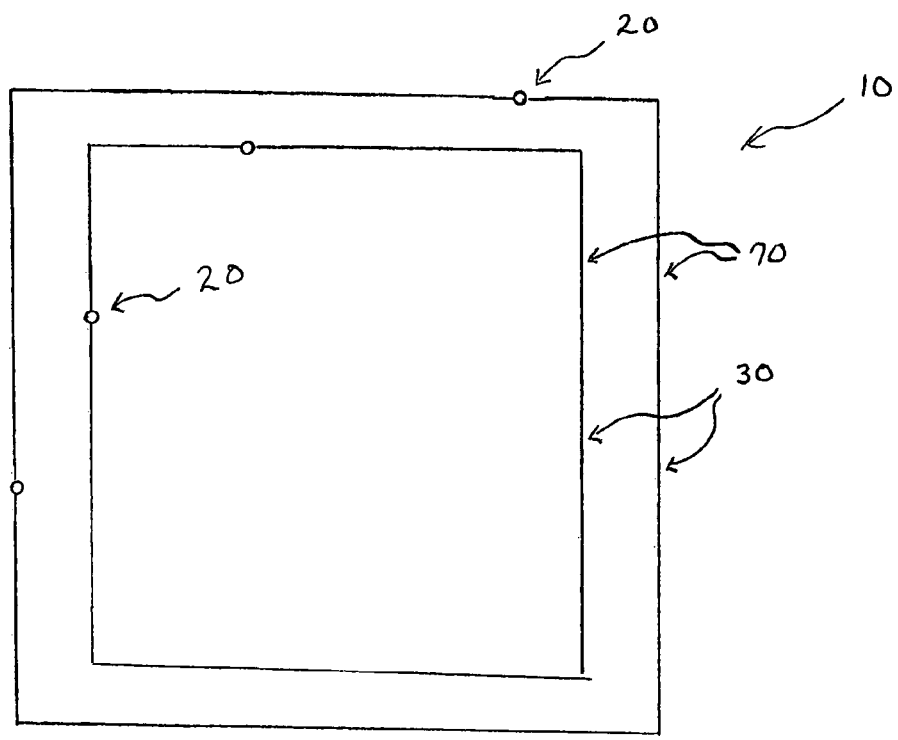
FIG. 4 shows an example of an alternative embodiment of the present invention with the concentric shapes of the encoding mark configured as rectangles.

FIG. 4 illustrates another possible configuration for the encoding mark 10. Here the concentric shape 30 is in the shape of a square. Distinctive marks 20 are located on the perimeter 70 of each square. The distinctive marks may either be filled-in or not. Note the distinctive marks 20 of FIG. 3 in comparison to the distinctive marks 21-24 of FIG. 1. Only two concentric shapes are shown for the sake of simplicity; however, those with skill in the art clearly understand that multiple concentric shapes are possible. However, as the number of sides to a concentric shape is reduced (e.g. from a circle to a square) the omni-directional detection and decoding becomes limited. Using the extreme examples of a circle and a square, any point from the center of the circle to the perimeter of the circle is at a known radius, but for a square from the center of the square to the 90 degree angle created in the corners is not equal to the distance from the center of the square to midpoint of a side of the square. However, the concentric shape that serves as a guide during placing the distinctive markings can also serve as a guide during the decoding. The concentric shape may be used as a guide either through overlaying the concentric shape on the distinctive mark of the encoding mark prior to decoding or while decoding.

Figure 5:
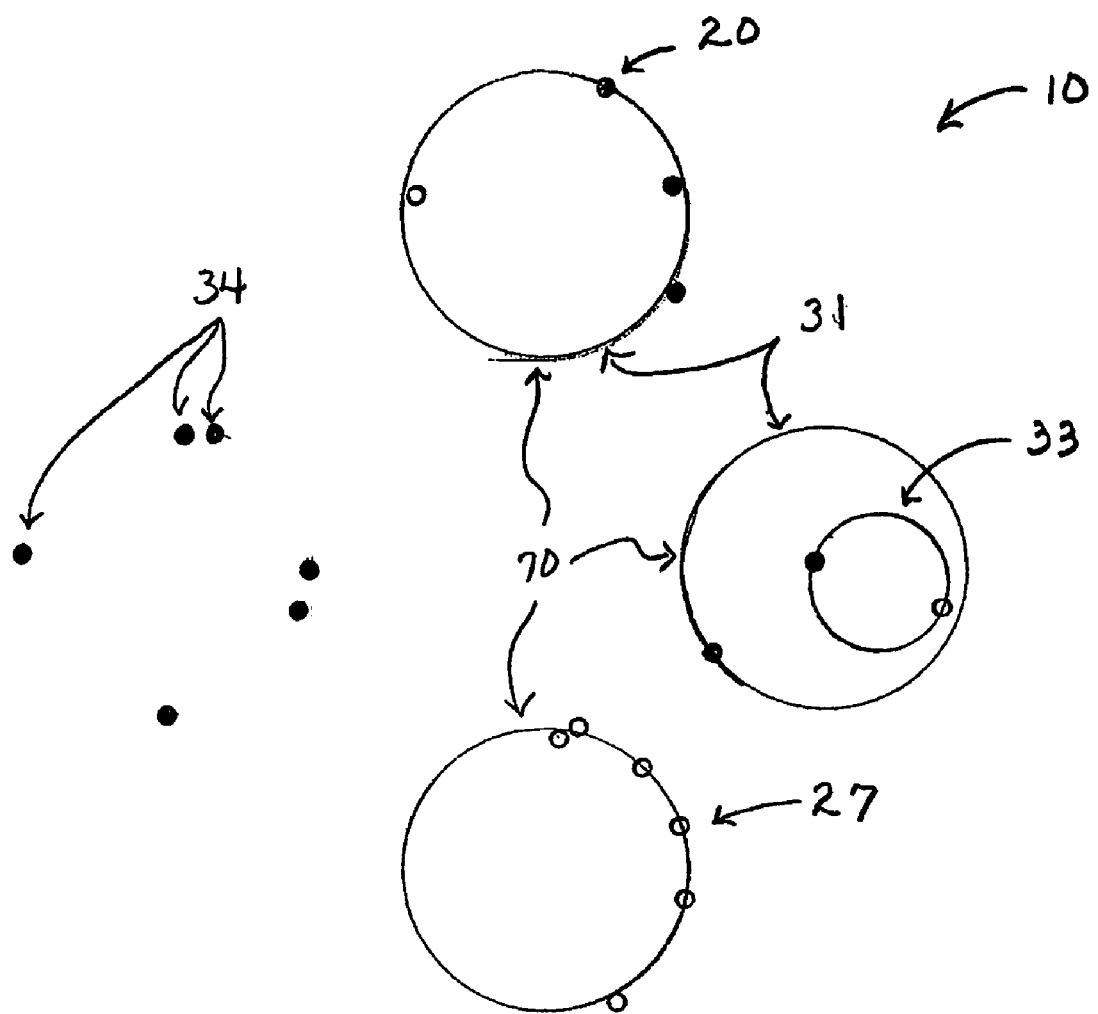
FIG. 5 shows an example of an alternative embodiment of the present invention with the shapes of the encoding mark configured as circles offset from one another.

FIG. 5 shows alternative embodiments of the present invention. In this preferred embodiment, the distinctive marks 20 are shown as combination of filled-in circles 20 and not filled-in circles 27. The shapes 31, 33 and 34 in this embodiment are no longer concentric shapes, but merely shapes. Noteworthy about this example is that the guide shapes 31 are not concentric or nested one within the other. The guide shapes 31 are offset a predetermined distance from one another, in this specific instance, they are oriented around a one-and-a-half inch square (not shown). Shape 33 is shown nested inside of another shape 31 and off center. This allows for further distinction of the markings and may serve the purpose of providing additional data or alignment and orientation for decoding. Similar to FIGS. 2 and 3, where the concentric shapes 30 are not placed on the object, the distinctive marks 34 are located on the perimeter of a circle (equal in diameter to shapes 31) that is not placed on the object. The distinctive marks 34 may be decoded in the same manner as the encoded data in FIGS. 2 and 3.

Reading and Decoding the Encoding Mark

Figure 6:
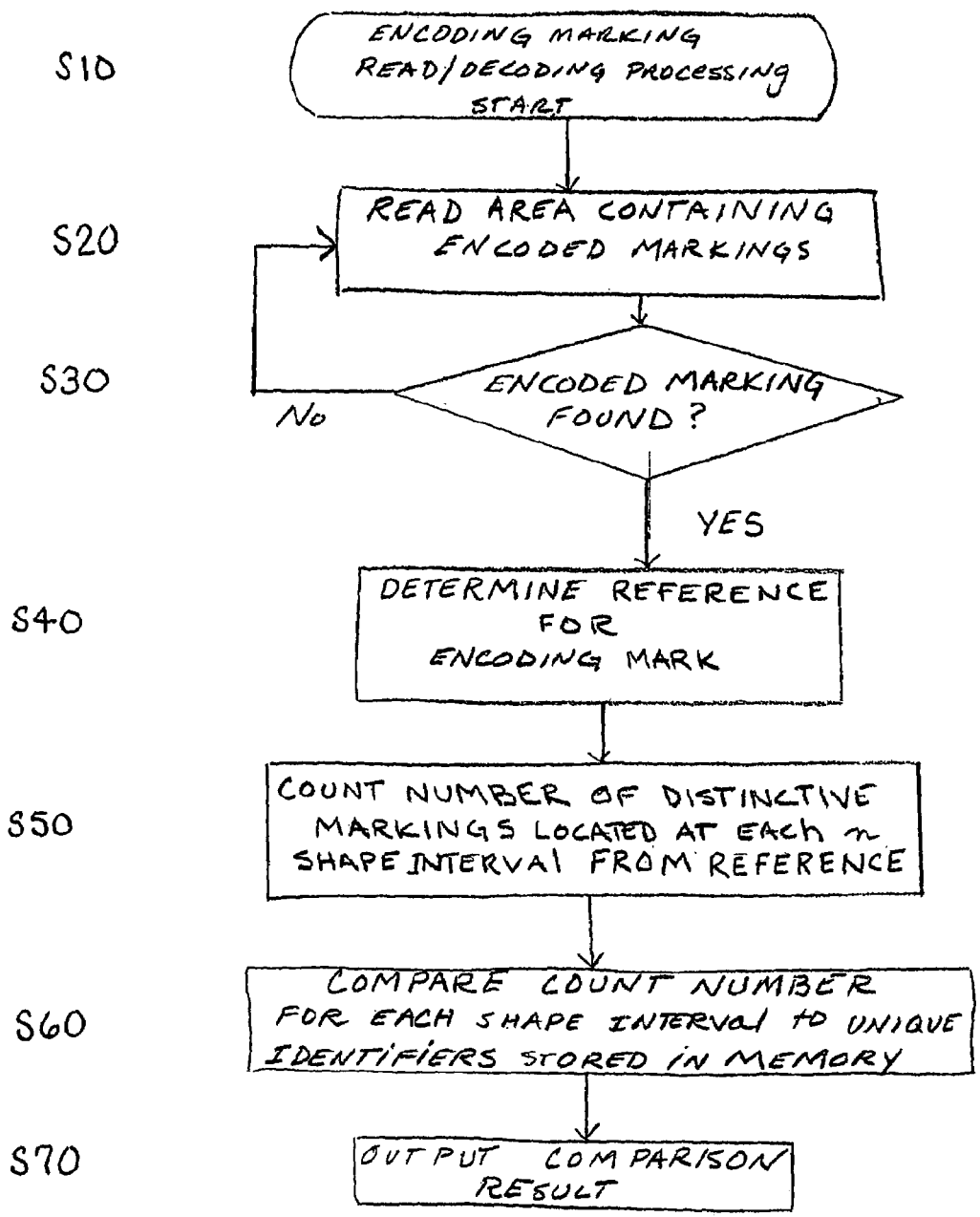
FIG. 6 is a flow chart outlining the encoding mark decoding process.

Any known optical, chemical, mechanical or magnetic reader that may read the area containing the encoding mark may be used to read the encoding mark of the invention. FIG. 6 is a flow chart illustrating the start of the reading and decoding process at S10. The primary concern is for the reader to read the entire encoding mark as shown in steps S20 and S30.

In a preferred embodiment, the area containing the entire mark should be read for the most accurate decoding of the encoded data. For example, in FIG. 2, the reader should be able to sense all of distinctive marks 20 located with the hatched lines 60, which encompass the area containing the encoding mark 10. The reader may sense a larger area, so long as all the distinctive marks 20 are in the larger area. The reader senses the encoded mark either through optical, including infrared, chemical, magnetic or mechanical means. The preferred embodiment uses optical reading to obtain a two-dimensional representation of the encoding mark. The reader may, for example, be a charged-coupled device (CCD) or a complimentary metal oxide semiconductor (CMOS) device, although those skilled in the art may know of other types of suitable readers. The two-dimensional representation of the encoding mark is suitable for decoding by a computer. The prior art discloses several readers that would be capable of reading the encoding mark of the invention. U.S. Pat. No. 6,619,547 to Crowther et al. discloses an IMAGE-BASED GRAPHICAL CODE READER WITH MULTI-FUNCTION OPTICAL ELEMENT AND CONVERGING LASER TARGETING capable of providing a two-dimensional representation of the object being imaged, the disclosure of which is hereby incorporated by reference in its entirety. The U.S. Pat. No. 6,619,547 patent also discloses the use of an aiming pattern that facilitates reading the encoding mark. U.S. Pat. No. 6,663,008 to Pettersson et al. also discloses a code reader suitable for use with the instant invention and its disclosure is hereby incorporated by reference in its entirety. U.S. Pat. No. 6,478,232 to Dowling et al. discloses encoding devices and scanners having high resolution capabilities, which may be used to implement the instant invention. The disclosure of U.S. Pat. No. 6,478,232 is hereby incorporated by reference in its entirety. Additionally, if a reader is not available, the distinctive markings may be manually counted, while noting the specific concentric shape on which the distinctive markings were placed. After finishing counting, the totals are compared to a table that has the corresponding number of distinctive markings and the concentric shape values for identification.

After the two-dimensional representation of the encoding mark is obtained, the two-dimensional representation must be decoded. Step S40 of FIG. 6 requires that a reference point be found for the read encoding mark. The reader has gathered the two-dimensional data contained within the hatched lines 30; now the computer must process the data. The center of the two-dimensional data must be located through some form of processing, examples of which are disclosed in U.S. Pat. No. 6,663,008 to Pettersson et al. It is known which concentric shapes were used to encode the data, so the computer may either use the known distances from the center of the two-dimensional representation and then the distance between each concentric shapes or any other method of decoding that is within the ordinary skill of one in the art.

Decoding may be accomplished in several ways as generally shown in steps S40-S70 of FIG. 6. A preferred embodiment uses the concentric shapes as a guide to both determine the reference for the encoding mark and which of the individual concentric shapes the distinctive mark is placed. The concentric shapes may either be overlaid prior to the reader reading the encoding mark by illuminating the object with the concentric shape pattern or by passing the object under a transparent medium with the concentric shape pattern imprinted thereon. Another option is to use image processing to determine the location of the distinctive marks with respect to the concentric shape pattern S40. For instance, FIG. 2 shows the preferred embodiment of the encoding mark. Once the locations of the distinctive marks are determined and the number of distinctive marks counted S50 on each concentric shape, these totals are compared to totals stored in memory S60 and a value is output S70. The computer decoding the encoded data would identify a complete traversal of the perimeter of a specific shape and move on to the next specific shape. Such computers are well known.

As an example, the encoded mark of FIG. 2 may be placed on a pill. The reader being used has a concentric shape pattern illumination means that projects the concentric shape guide on the pill. A two-dimensional representation is collected that looks like FIG. 1. The computer may now begin decoding the two-dimensional representation. The decoded two-dimensional data of the encoding mark shown in FIG. 2 is illustrated in Table 1 below. Looking at FIG. 1, the concentric shapes are assigned values starting in the center and proceeding outward or vice versa, but in the example, the first concentric shape will be assigned the number 1. The number of distinctive marks 20 on each concentric shape 30 is counted and a decoded value is obtained. All of the decoded values in context form the unique identifier represented by the encoding mark.

TABLE 1

| Concentric Shape number | Distinctive number count | Decoded Value |
| --- | --- | --- |
| 1 | 0 | D |
| 2 | 5 | E |
| 3 | 2 | P |
| 4 | 7 | R |
| 5 | 9 | E |
| 6 | 5 | S |
| 7 | 7 | S |
| 8 | 3 | A |
| 9 | 2 | N |
| 10 | 10 | T |

A pill with the distinctive mark shown in FIG. 2 would be determined to be in the class of drugs called a DEPRESSANT. Using that information, appropriate actions may be taken with respect to tracking, storing, and distributing the pill. As can be seen, the same number of distinctive marks on different concentric shapes may have different decoded values (e.g. concentric shape number two and concentric shape number six both have five distinctive marks but different decode values). The decoded value is not limited to alphabetic values, but may be any numerical or alphanumeric or combination so desired by the user. Table 1 is only an example of a possible implementation and the invention should not be limited by this example. Of course, the unique identifier may be a group of identifiers, such as, but not limited to, a three-digit lot number, three-digit plant number and a four-digit date code. Once the number of distinctive marks on the perimeter of a specific concentric ring is determined, those values may be found in a look-up table or some other memory device to provide the unique identifier. With possibly ten billion unique identifiers, the machine-readable encoding mark may be customized by the user to have a unique identifier representing any type of numerical, alphabetical, or alphanumeric code.

Field of Use

Of course, the encoding mark of the invention may be used on any object that requires marking. However, the preferred embodiment places the dots on a pill or capsule for identifying the pill for production and distribution purposes. Edible inks, including magnetic inks, molding or etching are examples of how the encoding mark maybe placed on the pill or capsule. However, other methods of pill marking may easily be substituted.

Due to the concentric nature of the encoding mark, reading may be accomplished from any angle. Additionally, because the distinctive markings are spatially independent on a specific concentric shape, the present invention merely requires that the distinctive mark fall substantially on the perimeter of its specific concentric shape.

While advantageous embodiments of the encoding mark have been chosen to illustrate the invention, it will be understood by those skilled in the art that various changes and modifications may be made therein without departing from the scope of the invention as defined in the appended claims.

What is claimed is:

1. A method of encoding data in an area on an object, the method comprising the steps of
    arranging in the area on the object at least one shape as a guide, each of the at least one shapes having a perimeter; and
    placing a predetermined number of distinctive physical markings, in any spatial orientation with respect to each other substantially on the perimeter of each of the at least one shapes using the at least one shape as the guide, to encode and mark the object with the data.

2. A method according to claim 1, wherein
    the arranging step further comprises arranging the at least one shapes with either uniform or non-uniform spacing or a combination of spacing between each of the at least one shapes.

3. A method according to claim 1, wherein
    the placing step further comprises placing either zero or a finite number of distinctive markings.

4. A method according to claim 1, wherein
    the placing step further comprises placing on the object the at least one shape and the distinctive markings by selecting from the group consisting of engraving, printing, imprinting, etching, molding, laser etching, laser engraving, overlaying, photochemical exposing, and holographic imprinting.

5. A method according to claim 1, wherein
    the placing step further comprises placing closed geometric shapes as the distinctive markings.

6. A method according to claim 5, wherein
    the placing step further comprises filling-in or not filling-in the closed geometric shapes.

7. A method according to claim 1, wherein
    the placing step further comprises placing distinctive markings substantially on an object by selecting from the group consisting of engraving, printing, imprinting, etching, molding, photochemical imprinting, overlaying, exposing, and holographic imprinting.

8. A method according to claim 1, wherein
    the arranging step further comprises arranging at least one of a plurality of substantially concentric shapes.

9. A method according to claim 8, wherein
    the arranging at least one of a plurality of substantially concentric shapes comprises arranging a plurality of substantially circular shapes.

10. A method of encoding data in an area on an object, the method comprising the steps of:
    arranging in the area on the object at least one shape as a guide, each of the at least one shapes having a perimeter; and
    placing a predetermined number of distinctive markings in any spatial orientation with respect to each other substantially on the perimeter of each of the at least one shapes to encode and mark the object with the data, wherein
    the arranging step further comprises the step of overlaying the object to be encoded with a template of the perimeter of each of the at least one shapes on which the distinctive markings are to be substantially placed.

11. A method according to claim 10, wherein the overlaying step further comprises the step of projecting a light pattern of the at least one shapes on the object to be encoded prior to the placing step.

12. A method for decoding an encoding mark placed in an area, the method comprising the steps of
reading from any perspective an area in which the encoding mark is located;
determining a point of reference for the encoding mark;
counting the number of distinctive markings that make up the encoding mark, the distinctive markings located substantially on the perimeter of at least one of a plurality of shapes, the predetermined number of distinctive markings and the specific perimeter of one of the plurality of shapes on which the distinctive mark is substantially placed corresponding to a predetermined identifier;
comparing the number of distinctive marks counted substantially on the perimeter of each of the at least one of a plurality of shapes in the counting step to the number of marks from each of the at least one of a plurality of shapes corresponding to the predetermined identifier; and
returning a result of the comparing step.

13. An object encoded with identifying data, comprising:
at least one shape forming an array, each said shape having a perimeter and being a guide; and
a predetermined number of distinctive physical markings positioned substantially on said perimeter of each said at least one said shape using each said at least one said shape as the guide, said distinctive markings being in any spatial orientation with respect to each other;
wherein said distinctive physical markings correspond to the data that identifies said object.

14. An object according to claim 13, wherein said object is a pill or capsule.

15. An object according to claim 13, wherein said predetermined number of distinctive markings is zero or a finite number.

16. An object according to claim 13, wherein said array of shapes is a predetermined number of substantially concentric shapes corresponding to said number of distinctive markings and to the encoded identifying data.

17. An object according to claim 13, wherein said predetermined number of distinctive marks are selected from the group consisting of polygons, stars, circles, triangles, squares, rectangles, trapezoids, rhombi, and dodecagons.

18. An object according to claim 17, wherein said distinctive markings are either be filled-in or not filled-in.

19. An object according to claim 13, wherein each of said at least one shapes forming said array is selected from the group consisting of polygons, stars, circles, ellipses, triangles, squares, rectangles, trapezoids, rhombi, and dodecagons.

20. An object according to claim 13, wherein said array is projected on said object as a light pattern prior to reading said distinctive markings to facilitate decoding.

21. An object according to claim 13, wherein said array is placed on said object either before or after said distinctive markings are placed on said object.

* * * * *